(12) United States Patent
Chen

(10) Patent No.: US 9,194,535 B2
(45) Date of Patent: Nov. 24, 2015

(54) SUPPORTING APPARATUS FOR ELECTRONIC DEVICE

(71) Applicant: HON HAI PRECISION INDUSTRY CO., LTD., New Taipei (TW)

(72) Inventor: Yi-Ru Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/516,891

(22) Filed: Oct. 17, 2014

(65) Prior Publication Data

US 2015/0108324 A1 Apr. 23, 2015

(30) Foreign Application Priority Data

Oct. 22, 2013 (TW) .............................. 102138167 A

(51) Int. Cl.
 *F16M 11/16* (2006.01)
 *F16M 11/22* (2006.01)
(52) U.S. Cl.
 CPC ............... *F16M 11/22* (2013.01); *F16M 11/16* (2013.01)
(58) Field of Classification Search
 CPC ... F16M 11/10; F16M 13/00; F16M 2200/08; F21L 15/08; F21V 21/14
 See application file for complete search history.

(56) References Cited

U.S. PATENT DOCUMENTS

| 2,677,147 | A | * | 5/1954 | Phillips | ........................... | 16/266 |
| 5,791,015 | A | * | 8/1998 | Wandinger | ...................... | 16/228 |
| 2008/0176610 | A1 | * | 7/2008 | Pan et al. | .................. | 455/575.3 |

* cited by examiner

*Primary Examiner* — Casandra Davis
(74) *Attorney, Agent, or Firm* — Novak Druce Connolly Bove + Quigg LLP

(57) ABSTRACT

A supporting apparatus for electronic device includes a sliding bracket and a mounting bracket. The sliding bracket includes a first mounting portion, a rotating axle, and a limiting block. The mounting bracket includes a second mounting portion and a pivoting hole. The rotating axle of the sliding bracket is inserted in the pivoting hole of the mounting bracket. The rotating axle can be rotated relative to the mounting bracket from a closed state to an opened state. In the closed state, the sliding bracket is coplanar with the mounting bracket in the supporting apparatus, and the first mounting portion attracts the second mounting portion by a magnetic force. In the opened state, the sliding bracket is rotated on the mounting bracket, the limiting block resists against the mounting bracket to stop the sliding bracket rotating, and the sliding bracket is kept at a require angle on the mounting bracket.

13 Claims, 8 Drawing Sheets

SUPPORTING APPARATUS FOR ELECTRONIC DEVICE

CROSS-REFERENCE TO RELATED APPLICATIONS

This application claims priority to Chinese Patent Application No. 102138167 filed on Oct. 22, 2013 in the Taiwan Intellectual Property Office, the contents of which are incorporated by reference herein.

FIELD

The subject matter herein generally relates to a supporting apparatus for electronic device.

BACKGROUND

Electronic devices such as panel computers include supporting brackets to support the panel computers on a platform. A conventional supporting bracket usually includes a supporting panel mounted to a back of the panel computer, and a number of supporting legs placed on the platform.

BRIEF DESCRIPTION OF THE DRAWINGS

Implementations of the present technology will now be described, by way of example only, with reference to the attached figures.

DETAILED DESCRIPTION

Figure 1:
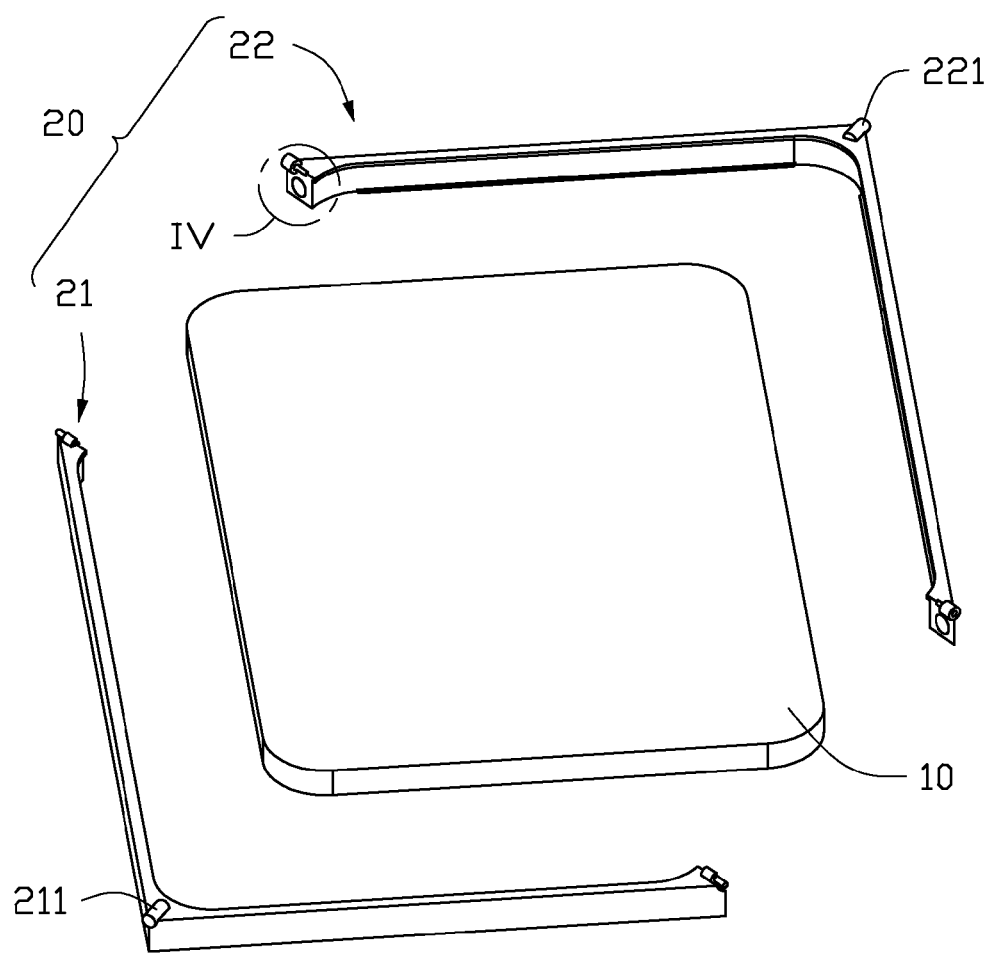
FIG. 1 is an exploded, isometric view of an embodiment of a supporting apparatus for electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
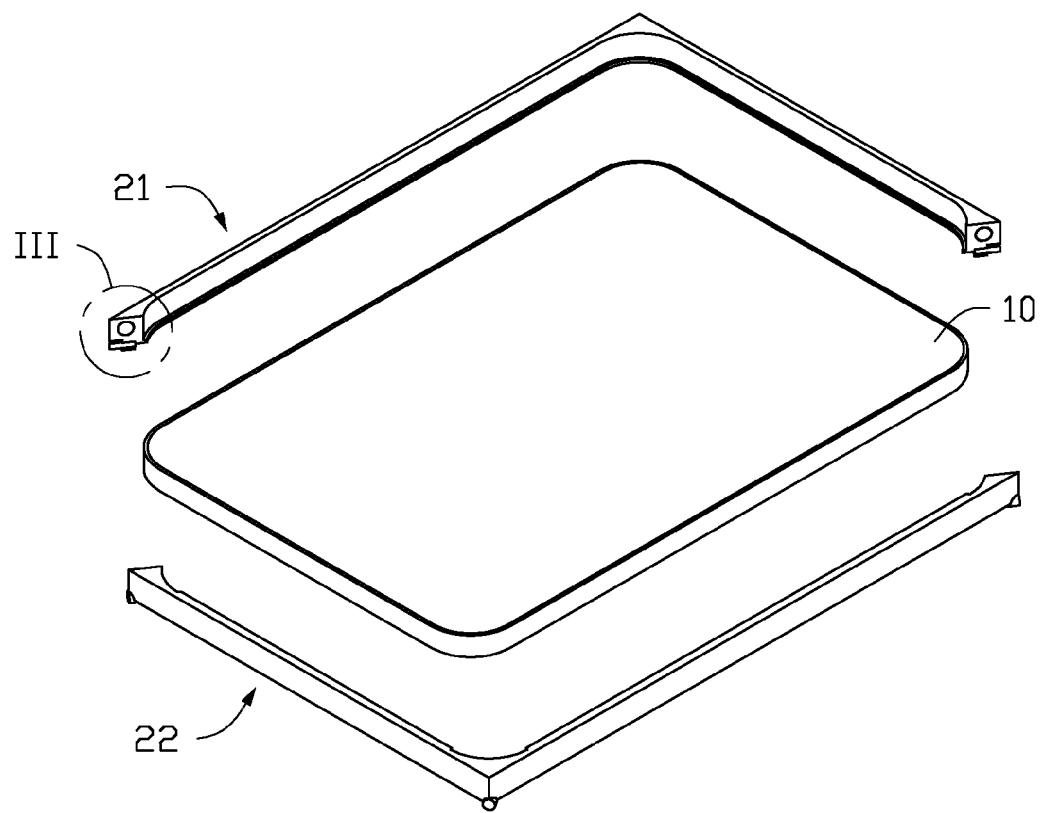
FIG. 2 is similar to FIG. 1, but viewed from another angle.

FIGS. 1 and 2 illustrate a supporting apparatus 20 for an electronic device 10 in accordance with an embodiment. The electronic device 10 can be a panel computer or a smart phone.

Figure 3:
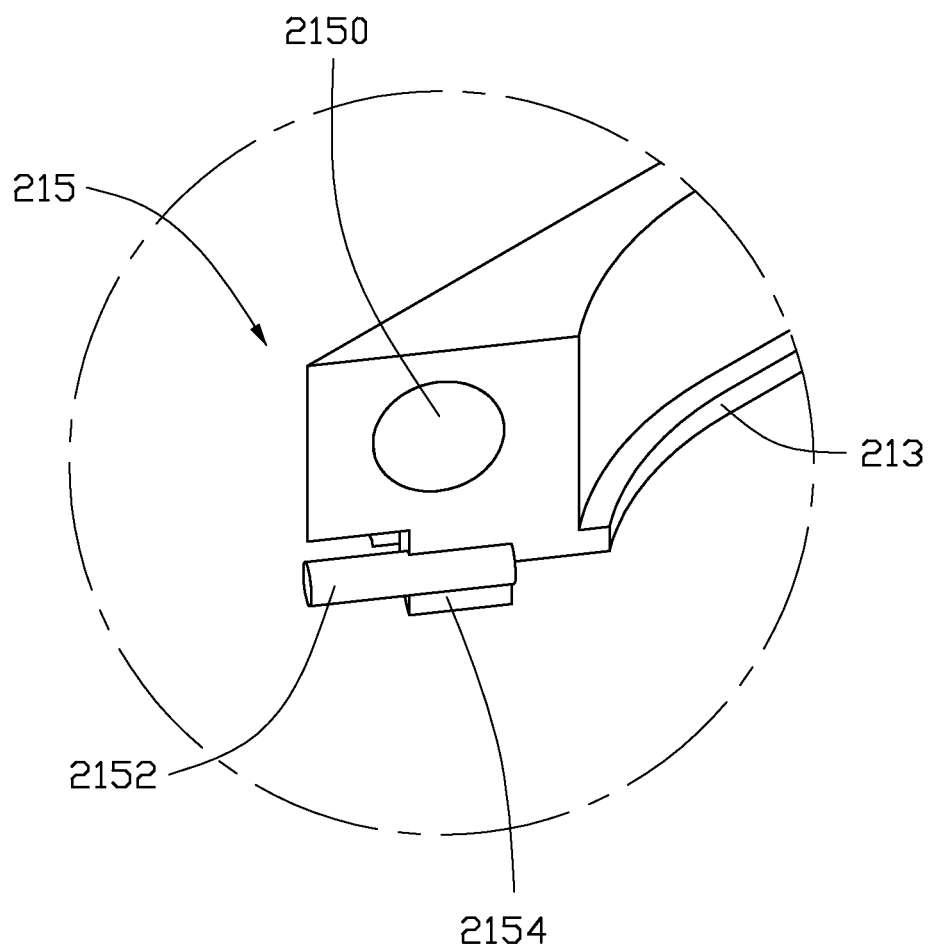
FIG. 3 is an enlarged view of a circled portion III of FIG. 2.
Figure 4:
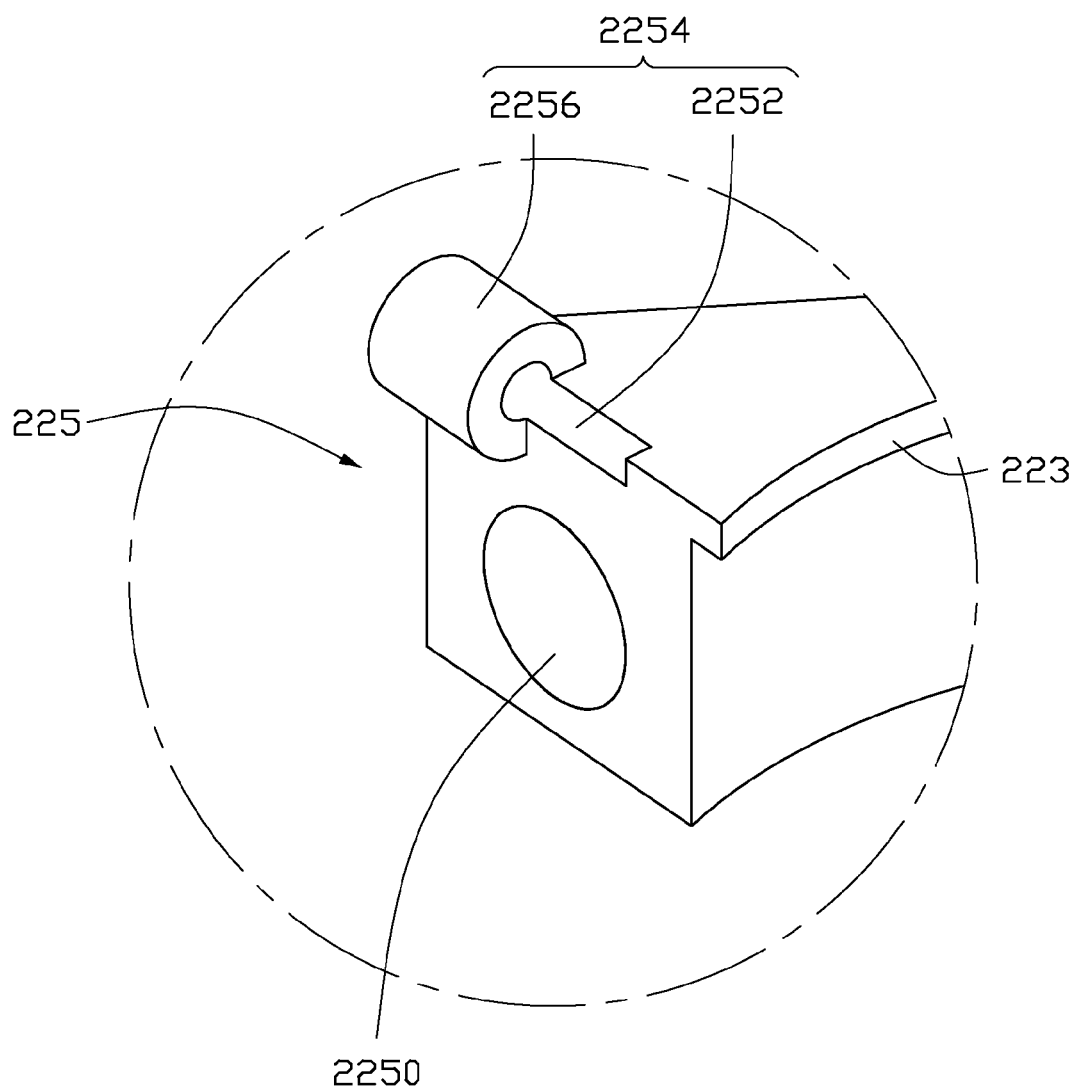
FIG. 4 is an enlarged view of a circled portion IV of FIG. 1.

FIGS. 3 and 4 illustrate the supporting apparatus 20 includes a sliding bracket 21 and a mounting bracket 22. A first protrusion portion 211 is located at a corner of the sliding bracket 21. A first tab 213 extends from an inner side of the sliding bracket 21. A connection member 215 is located on each of two distal ends of the sliding bracket 21. Each connection member 215 includes a first mounting portion 2150, a rotating axle 2152, and a limiting block 2154. In one embodiment, the sliding bracket 21 is substantially L shaped. The first mounting portion 2150 can be a magnet. The rotating axle 2152 and the limiting block 2154 are below the first mounting portion 2150. An extension direction of the rotating axle 2152 is substantially parallel to an extension direction of a connection line of the two distal ends of the sliding bracket 21.

A second protrusion portion 221 is located at a corner of the mounting bracket 22. A second tab 223 extends from an inner side of the mounting bracket 22. A mounting member 225 is located on each of two distal ends of the mounting bracket 22. Each mounting member 225 includes a second mounting portion 2250 and a pivoting portion 2254. A third protrusion portion 2256 is located on the pivoting portion 2254. A pivoting hole 2252 is defined in the third protrusion portion 2256. In one embodiment, the mounting bracket 22 is substantially L shaped. The second mounting portion 2250 can be a magnet.

Figure 5:
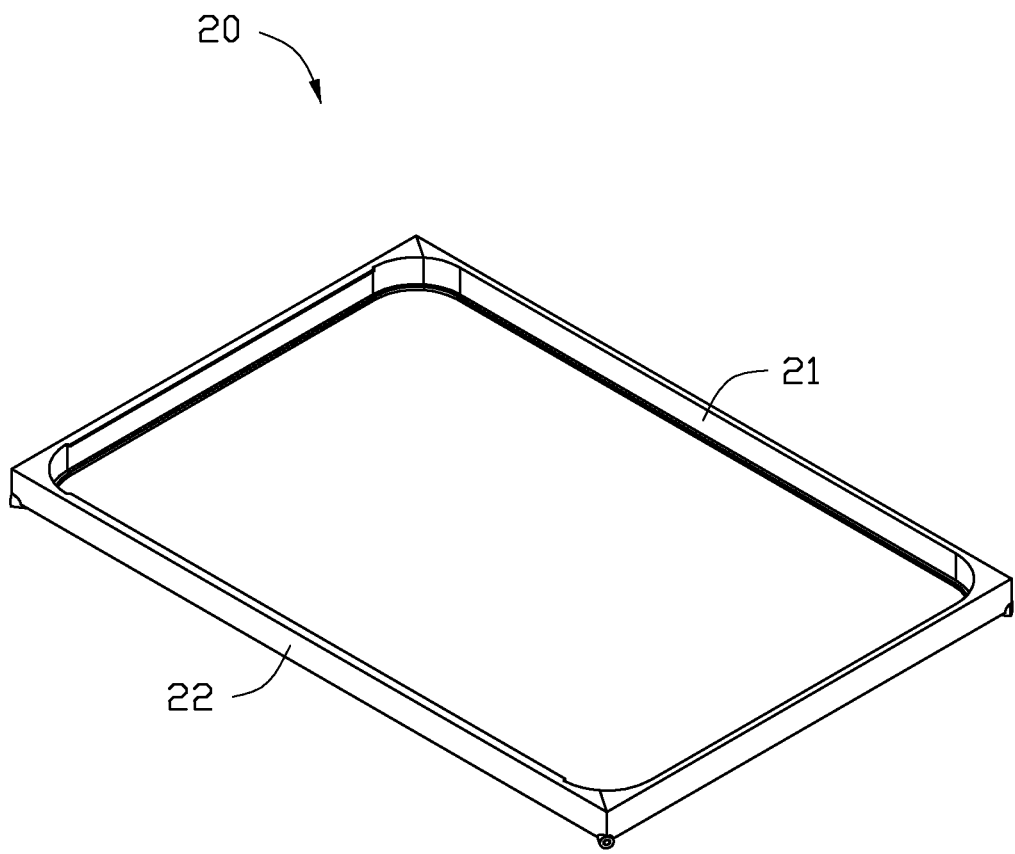
FIG. 5 is an assembled, isometric view of the supporting apparatus for electronic device of FIG. 1, in a working state.
Figure 6:
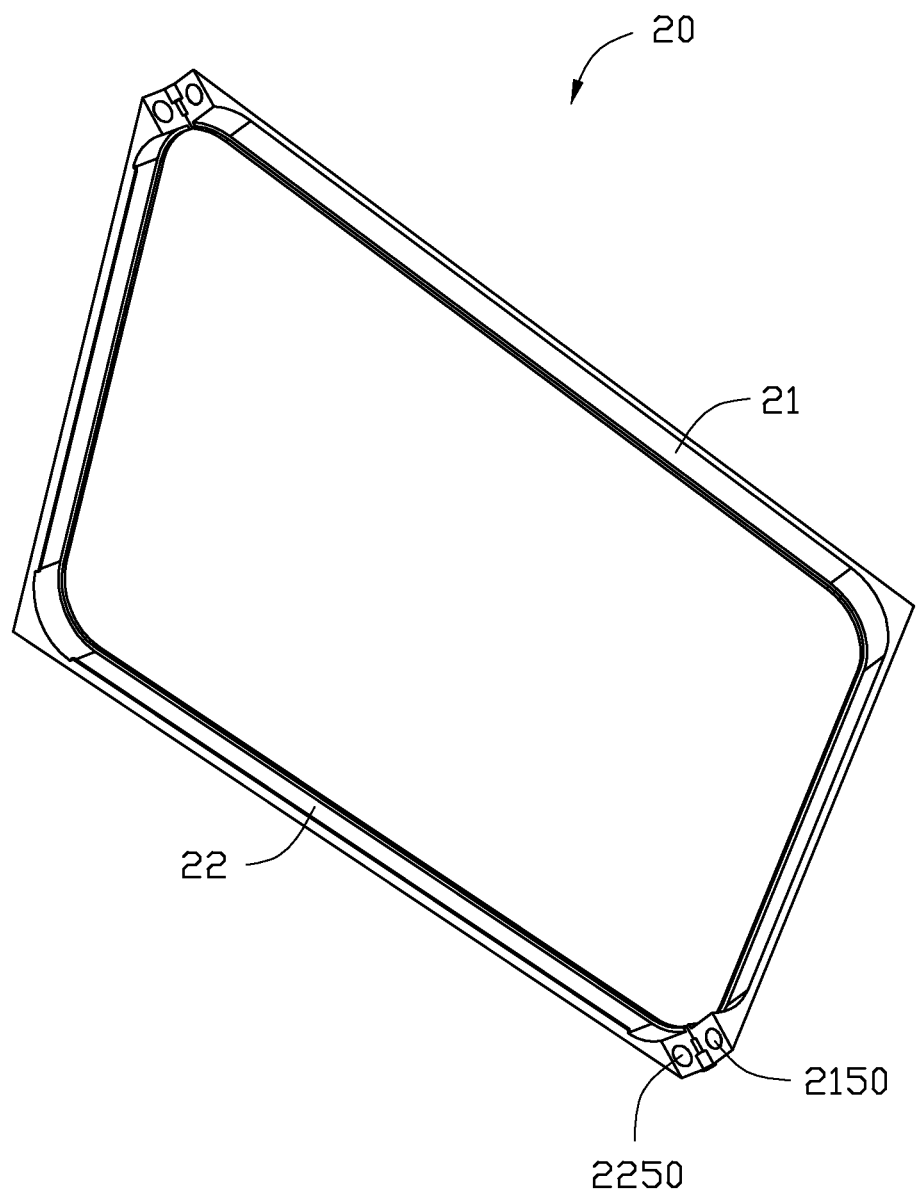
FIG. 6 is similar to FIG. 5, but in another working state.

FIG. 5 and FIG. 6 illustrate that in assembly, the rotating axles 2152 of the sliding bracket 21 are inserted in the pivoting holes 2252 of the mounting bracket 22. The sliding bracket 21 is rotatably connected to the mounting bracket 22. The sliding bracket 21 is configured to rotate relative to the mounting bracket 22 from a closed state to an opened state. In the closed state, the sliding bracket 21 is coplanar with the mounting bracket 22 in the supporting apparatus 20, the first mounting portion 2150 attracts the second mounting portion 2250 by a magnetic force, and the sliding bracket 21 is prevented from rotating relative to the mounting bracket 22. In the opened state, the sliding bracket 21 is rotated on the mounting bracket 22, the limiting block 2154 resists against the mounting bracket 22 to stop the sliding bracket 21 rotating, and the sliding bracket 21 is kept at a require angle on the mounting bracket 22.

When the electronic device 10 is mounted to the supporting apparatus 20, the sliding bracket 21 is rotated to the opened state, the supporting apparatus 20 is positioned on the mounting bracket 22, the sliding bracket 21 is then rotated to the closed state, and the sliding bracket 21 and the mounting bracket 22 are mounted surround the electronic device 10. The electronic device 10 is supported by the first tab 213 and the second tab 223. The sliding bracket 21 and the mounting bracket 22 contact four sides of the electronic device 10, and protect the electronic device 10 from being damaged. The first protrusion portion 211, the second protrusion portion 221, and the third protrusion portion 2256 support the electronic device 10 on a platform (not shown). A space is formed between the first protrusion portion 211, the second protrusion portion 221, the third protrusion portion 2256, and the platform. The electronic device 10 is further protected from being damaged.

Figure 7:
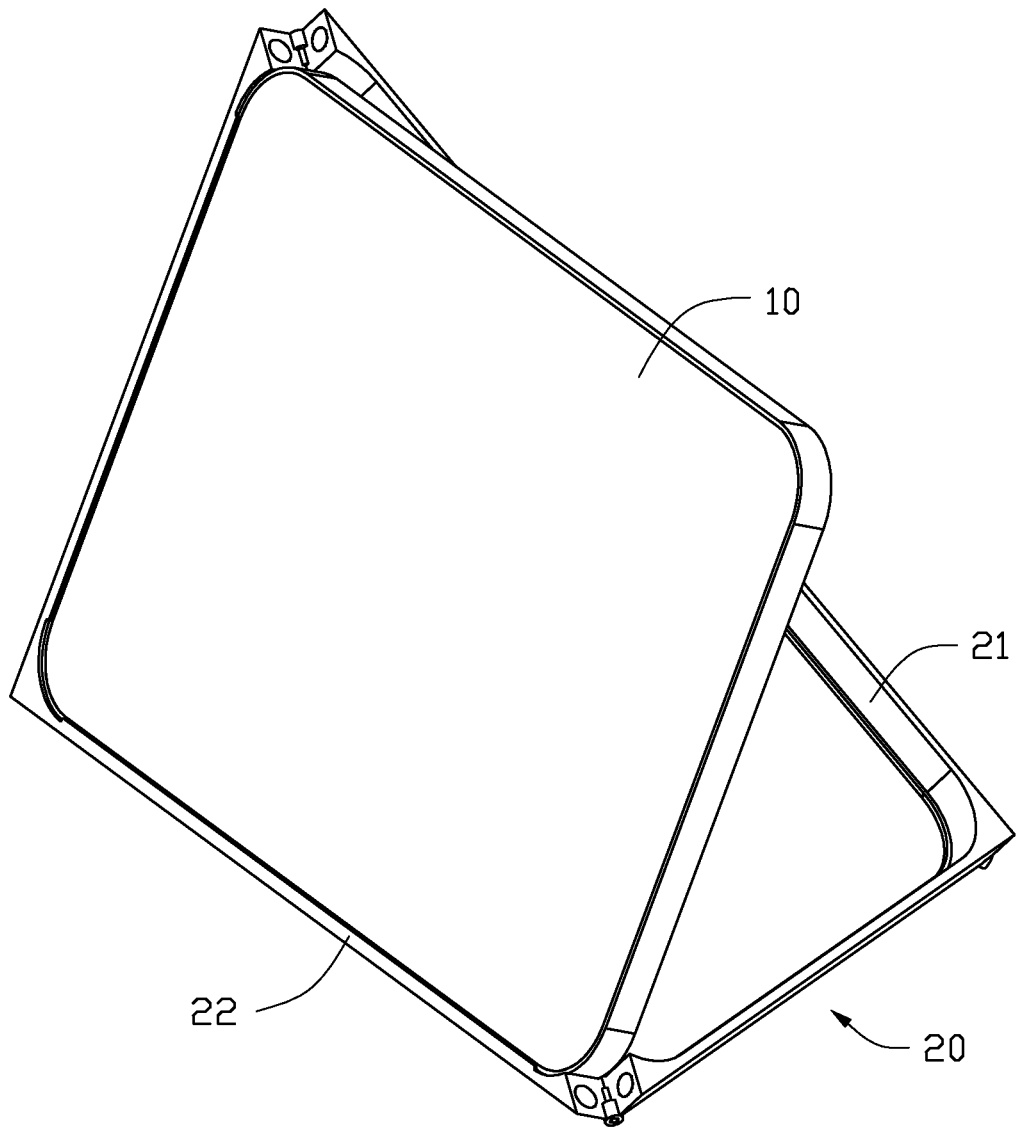
FIG. 7 is similar to FIG. 6, but in another working state.

FIG. 7 illustrates when the sliding bracket 21 is rotated to the opened state, the sliding bracket 21 and the mounting bracket 22 support the electronic device 10 on the platform (not shown). The electronic device 10 is supported by the second tab 223.

Figure 8:
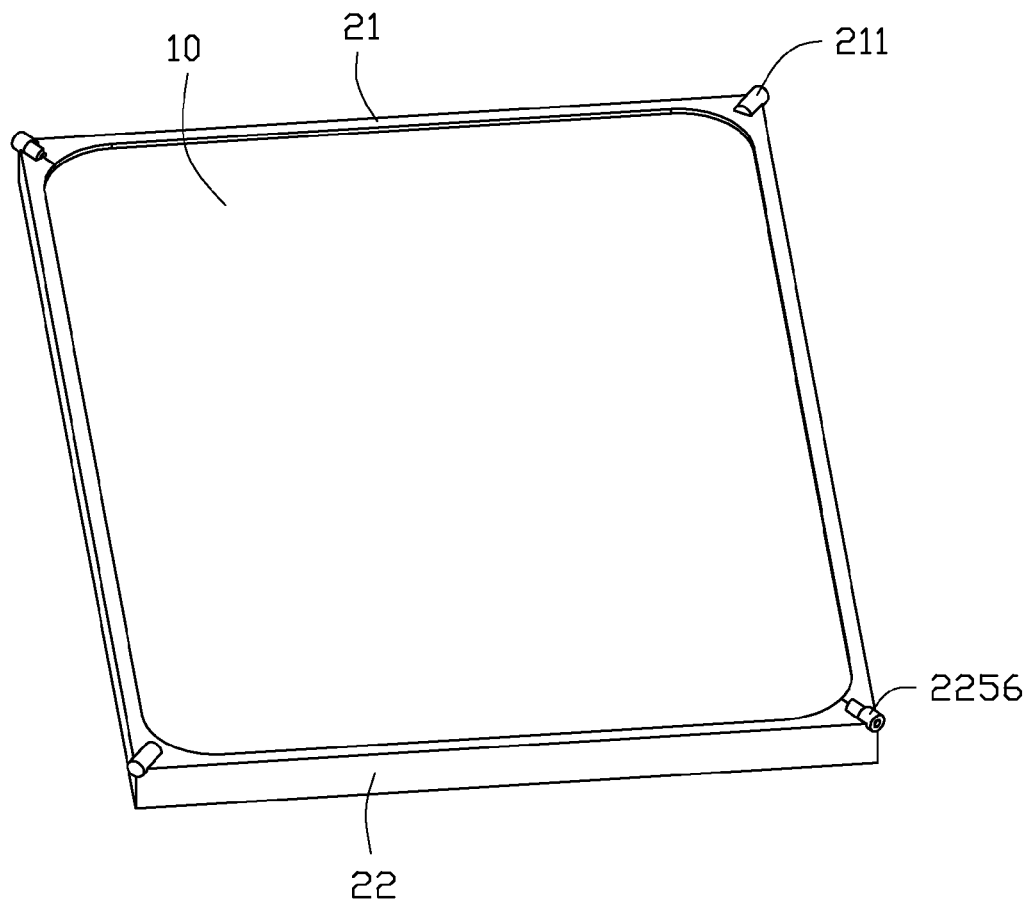
FIG. 8 is similar to FIG. 7, but in another working state.

FIG. 8 illustrates when the electronic device 10 is taken away from the platform (not shown), the sliding bracket 21 is rotated back to the closed state.

The embodiments shown and described above are only examples. Many details are often found in the art such as the other features of a printed circuit board. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A supporting apparatus for electronic device, comprising:
   a sliding bracket comprising a first mounting portion, a rotating axle, and a limiting block; and
   a mounting bracket comprising a second mounting portion and a pivoting hole;
   wherein the rotating axle of the sliding bracket is inserted in the pivoting hole of the mounting bracket, the sliding bracket is rotatably connected to the mounting bracket, and the rotating axle is configured to be rotated relative to the mounting bracket from a closed state to an opened state;
   wherein in the closed state, the sliding bracket is coplanar with the mounting bracket in the supporting apparatus, and the first mounting portion attracts the second mounting portion by a magnetic force; and
   wherein in the opened state, the sliding bracket is rotated on the mounting bracket, the limiting block resists against the mounting bracket to stop the sliding bracket rotating, and the sliding bracket is kept at a require angle on the mounting bracket.

2. The supporting apparatus of claim 1, wherein each of the sliding bracket and the mounting bracket is substantially L shaped.

3. The supporting apparatus of claim 1, wherein each of the first mounting portion and the second mounting portion can be a magnet.

4. The supporting apparatus of claim 1, wherein the rotating axle and the limiting block are below the first mounting portion.

5. The supporting apparatus of claim 1, wherein an extension direction of the rotating axle is substantially parallel to an extension direction of a connection line of two distal ends of the sliding bracket.

6. The supporting apparatus of claim 1, wherein the sliding bracket further comprises a first protrusion portion, the mounting bracket further comprises a second protrusion portion and a third protrusion portion located on the mounting bracket, the first protrusion portion, the second protrusion portion, and the third protrusion portion support the electronic device on a platform, and space is formed between the first protrusion portion, the second protrusion portion, the third protrusion portion, and the platform.

7. The supporting apparatus of claim 1, wherein the sliding bracket further comprises a first tab, the mounting bracket further comprises a second tab, the first tab and the second tab support the electronic device in the closed state, and the second tab supports the electronic device in the opened state.

8. A supporting apparatus for electronic device, comprising:
   a sliding bracket comprising a first mounting portion, a rotating axle, a limiting block, and a first tab; and
   a mounting bracket comprising a second mounting portion, a pivoting hole, and a second tab;
   wherein the rotating axle of the sliding bracket is inserted in the pivoting hole of the mounting bracket, the sliding bracket is rotatably connected to the mounting bracket, and the rotating axle is capable of being rotated relative to the mounting bracket from a closed state to an opened state;
   wherein in the closed state, the sliding bracket is coplanar with the mounting bracket in the supporting apparatus, the first mounting portion attracts the second mounting portion by a magnetic force, and the first tab and the second tab support the electronic device; and
   wherein in the opened state, the sliding bracket is rotated on the mounting bracket, the limiting block resists against the mounting bracket to stop the sliding bracket rotating, the sliding bracket is stayed at a require angle on the mounting bracket, and the second tab supports the electronic device.

9. The supporting apparatus of claim 8, wherein each of the sliding bracket and the mounting bracket is substantially L shaped.

10. The supporting apparatus of claim 8, wherein each of the first mounting portion and the second mounting portion can be a magnet.

11. The supporting apparatus of claim 8, wherein the rotating axle and the limiting block are below the first mounting portion.

12. The supporting apparatus of claim 8, wherein an extension direction of the rotating axle is substantially parallel to an extension direction of a connection line of two distal ends of the sliding bracket.

13. The supporting apparatus of claim 8, wherein the sliding bracket further comprises a first protrusion portion, the mounting bracket further comprises a second protrusion portion and a third protrusion portion located on the mounting bracket, the first protrusion portion, the second protrusion portion, and the third protrusion portion support the electronic device on a platform, and space is formed between the first protrusion portion, the second protrusion portion, the third protrusion portion, and the platform.

* * * * *